US012325226B2

(12) United States Patent
Darrow

(10) Patent No.: US 12,325,226 B2
(45) Date of Patent: Jun. 10, 2025

(54) SLING FOR SUPPORTING MUGS DURING SUBLIMATION PRINTING

(71) Applicant: Dartronics, Inc., Perth Amboy, NJ (US)

(72) Inventor: Kenneth A. Darrow, Perth Amboy, NJ (US)

(73) Assignee: DARTRONICS INC., Perth Amboy, NJ (US)

( * ) Notice: Subject to any disclaimer, the term of this patent is extended or adjusted under 35 U.S.C. 154(b) by 78 days.

(21) Appl. No.: 18/134,403

(22) Filed: Apr. 13, 2023

(65) Prior Publication Data

US 2023/0339248 A1 Oct. 26, 2023

Related U.S. Application Data

(60) Provisional application No. 63/332,751, filed on Apr. 20, 2022.

(51) Int. Cl.
*B41F 17/00* (2006.01)
*B41F 16/00* (2006.01)

(52) U.S. Cl.
CPC ........ *B41F 17/002* (2013.01); *B41F 16/0086* (2013.01); *B41P 2217/62* (2013.01)

(58) Field of Classification Search
CPC ........................ B41F 16/0046; B41F 16/0073; B41F 16/008; B41F 16/0086; B41F 17/002; B41M 5/035; B41M 5/38221; B41P 2217/62; B41P 2217/60; B41P 2217/61; A47B 49/002; A47B 63/065; A47F 3/085; A47F 5/03; Y10T 156/18
USPC ..... D15/144, 146; 248/128, 145.6; 156/359, 156/579, 583.3
See application file for complete search history.

(56) References Cited

U.S. PATENT DOCUMENTS

| | | | |
|---|---|---|---|
| 3,816,221 | A | 6/1974 | Shank, Jr. |
| 4,874,454 | A | 10/1989 | Talalay et al. |
| 5,019,193 | A | 5/1991 | Aramini |
| 5,170,704 | A | 12/1992 | Warren et al. |
| 5,244,529 | A | 9/1993 | Siegel |
| 5,296,081 | A | 3/1994 | Morin et al. |

(Continued)

FOREIGN PATENT DOCUMENTS

| | | | |
|---|---|---|---|
| BR | 102018076480 A2 * | 7/2020 | ............. B29C 33/20 |
| DE | 102017129008 A1 * | 6/2019 | ............. B41F 16/00 |

*Primary Examiner* — Jonathan Liu
*Assistant Examiner* — Guang H Guan
(74) *Attorney, Agent, or Firm* — Budzyn IP Law, LLC

(57) ABSTRACT

A sling is provided herein for supporting mugs during sublimation printing. The sling includes an elongated base with first and second stanchions mounted thereto. First and second arms extend between, and are pivotally mounted to, the first and second stanchions. At least one silicone wrap is secured to the first and second arms so as to be suspended therebetween. The first and second arms are movable between an open state, where the first and second arms are spaced a first distance to allow a mug to pass therebetween into resting engagement with the at least one silicone wrap, and a closed state, where the first and second arms are spaced a second distance less than the first distance. Advantageously, the sling of the subject invention provides a fixture for supporting one or more mugs for sublimation printing for use in an oven without need for individually mounting silicone wraps.

5 Claims, 12 Drawing Sheets

(56) References Cited

U.S. PATENT DOCUMENTS

| | | | | |
|---|---|---|---|---|
| 5,382,313 | A | 1/1995 | Eminger | |
| 5,395,478 | A | 3/1995 | Sattler et al. | |
| 5,584,961 | A | 12/1996 | Ellsworth et al. | |
| 5,630,894 | A | 5/1997 | Koch et al. | |
| 9,272,567 | B2 * | 3/2016 | Polk | B65C 3/14 |
| 11,267,238 | B2 * | 3/2022 | Woolthuis | B41F 16/008 |
| 11,548,307 | B2 * | 1/2023 | Peng | B41J 3/40731 |
| 11,647,868 | B2 * | 5/2023 | Woolthuis | B41F 16/0086<br>156/240 |
| 12,083,786 | B1 * | 9/2024 | Morin | B41F 16/0046 |
| 2007/0209763 | A1 * | 9/2007 | Chen | B41F 16/00<br>156/583.1 |
| 2007/0214974 | A1 * | 9/2007 | Goss | C04B 41/009<br>101/35 |
| 2023/0339248 | A1 * | 10/2023 | Darrow | B41M 5/38221 |
| 2024/0092076 | A1 * | 3/2024 | Peng | B41F 16/008 |

* cited by examiner

SLING FOR SUPPORTING MUGS DURING SUBLIMATION PRINTING

CROSS-REFERENCE TO RELATED APPLICATION

This application claims priority to U.S. Provisional Patent Appl. No. 63/332,751, filed Apr. 20, 2022, the contents of which are incorporated by reference herein.

FIELD OF THE INVENTION

The present invention relates generally to the field of sublimation transfers, and more particularly to an improved apparatus for use in applying heat transferable decals to containers or other similar articles having a handle, such as mugs or cups.

BACKGROUND OF THE INVENTION

Well known techniques have been developed over the years for decorating and personalizing containers, such as ceramic cups, mugs and the like. One common technique used for this purpose is sublimation printing, wherein sublimation transfers are used which incorporate sublimable dyes in the form of a decorative design, image and/or any other desired indicia for transferring to the mug. To decorate a mug in this manner, the sublimation transfer is placed in direct contact with the mug which has been coated with a polymeric coating. With a cuff or wrap pressing the sublimation transfer against the mug, the mug is heated to a temperature at least as high as the sublimation temperature of the dyes constituting the image to be printed. This process causes vaporization of the dyes constituting the image and their immediate absorption into the polymeric coating on the mug, thereby resulting in the image being transferred from the sublimation transfer to the mug.

Sublimation printing is well known in the art and numerous processes and devices have been developed in the past for transferring images and the like to the surface of mugs and similar articles by sublimation. For example, the following U.S. Patents, which are incorporated by reference herein, describe various techniques and equipment to effect sublimation transfers and/or other similar operations: U.S. Pat. No. 5,244,529 to Siegel; U.S. Pat. No. 5,296,081 to Morin et al.; U.S. Pat. No. 5,584,961 to Ellsworth et al.; U.S. Pat. No. 5,395,478 to Sattler et al.; U.S. Pat. No. 5,382,313 to Eminger; U.S. Pat. No. 5,019,193 to Aramini; U.S. Pat. No. 5,170,704 to Warren et al.; U.S. Pat. No. 4,874,454 to Talalay et al.; U.S. Pat. No. 3,816,221 to Shank, Jr.; and U.S. Pat. No. 5,630,894 to Koch et al.

A key element in sublimation printing is to apply the sublimation transfer smoothly onto the mug with no wrinkles or air bubbles. Equipment has been developed in the prior art to wrap a sublimation transfer about a mug and to tape the sublimation transfer in place using heat resistant tape. The sublimation transfer is held in tension about the mug to minimize wrinkling or gapping.

To ensure that the sublimation transfer is fully, and smoothly, printed on the mug, circumferential pressure is applied to the wrapped sublimation transfer during heating, using one of two techniques. In one technique, a mug heat press is utilized in which a mug is placed within a split cuff, with the cuff in an open state. The cuff is closed to generally encircle the mug in applying even pressure about the wrapped sublimation transfer. Heat is applied through the cuff, with the cuff remaining closed, for sublimation printing. Once sufficiently heated, the cuff is released to allow removal of the mug.

In a second technique, a silicone wrap is wrapped about the mug which is locked in tension using a clamp. The silicone wrap is mounted to the mug with even pressure being applied about the wrapped sublimation transfer. This whole assembly is then heated in an oven for sublimation printing. Once sufficiently heated, the mug is removed from the oven and the silicone wrap is removed. With this technique, each individual mug requires application of a silicone wrap.

SUMMARY OF THE INVENTION

A sling is provided herein for supporting mugs during sublimation printing. The sling includes an elongated base having opposing first and second ends with first and second stanchions mounted to the first and second ends of the base respectively. First and second arms extend between, and are pivotally mounted to, the first and second stanchions. At least one silicone wrap is secured to the first and second arms so as to be suspended therebetween. The first and second arms are movable between an open state, where the first and second arms are spaced a first distance to allow a mug to pass therebetween into resting engagement with the at least one silicone wrap, and a closed state, where the first and second arms are spaced a second distance less than the first distance. Advantageously, the sling of the subject invention provides a fixture for supporting one or more mugs for sublimation printing for use in an oven without need for individually mounting silicone wraps.

These and other features of the subject invention will be better understood through a detailed study of the following description and accompanying drawings.

DETAILED DESCRIPTION

Figure 1:
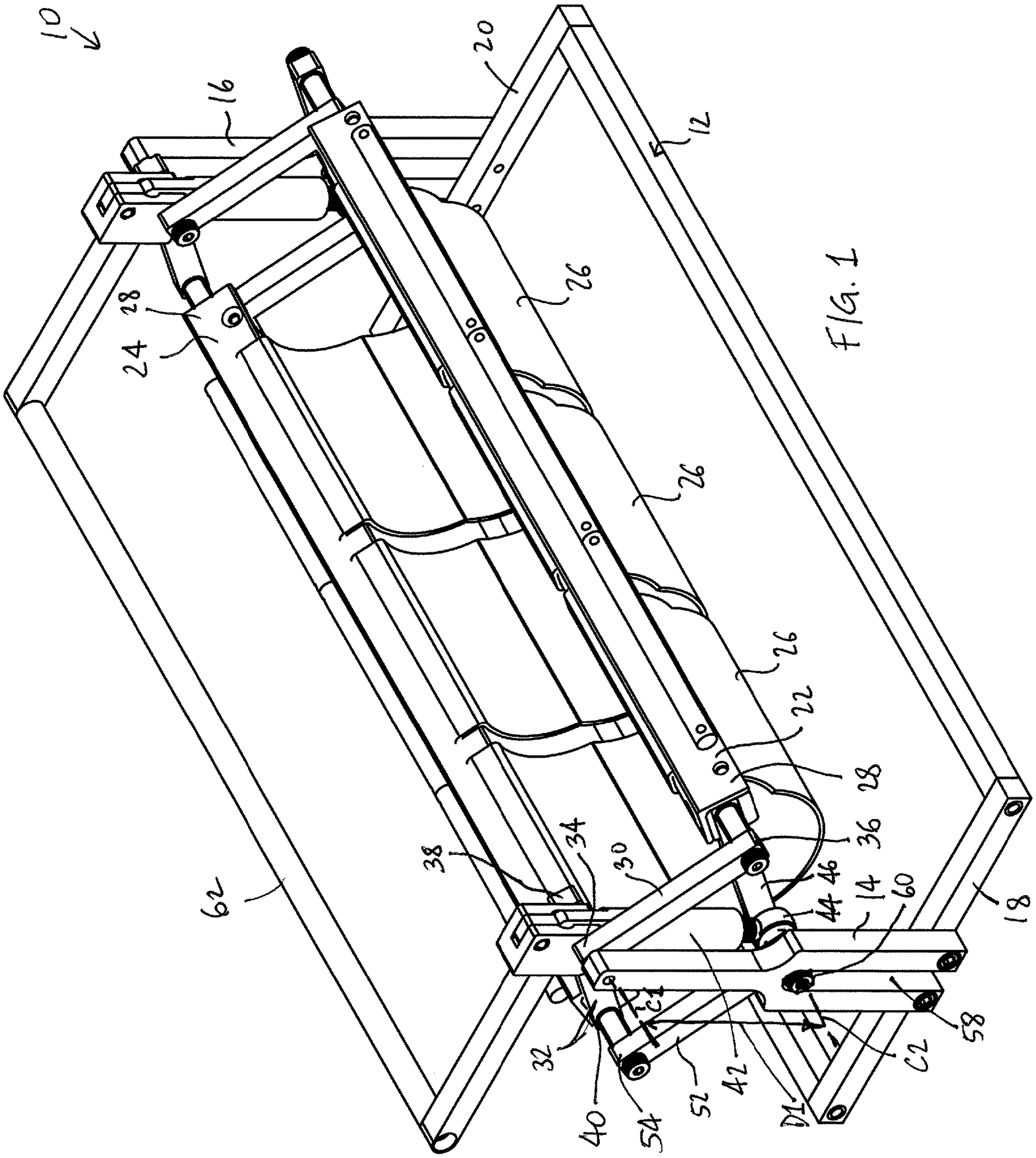
FIG. 1 is a perspective view of a sling, in an open state, for supporting mugs during sublimation printing in accordance with the subject invention.

As shown in the drawings, a sling 10 is provided for supporting one or more mugs M during sublimation printing. The sling 10 includes an elongated base 12, which may be frame shaped.

First and second stanchions 14, 16 are mounted to first and second ends 18, 20 of the base 12. First and second arms 22, 24 extend between, and are pivotally mounted to, the first and second stanchions 14, 16. At least one silicone wrap 26 is secured to the first and second arms 22, 24 so as to be suspended therebetween.

Figure 5:
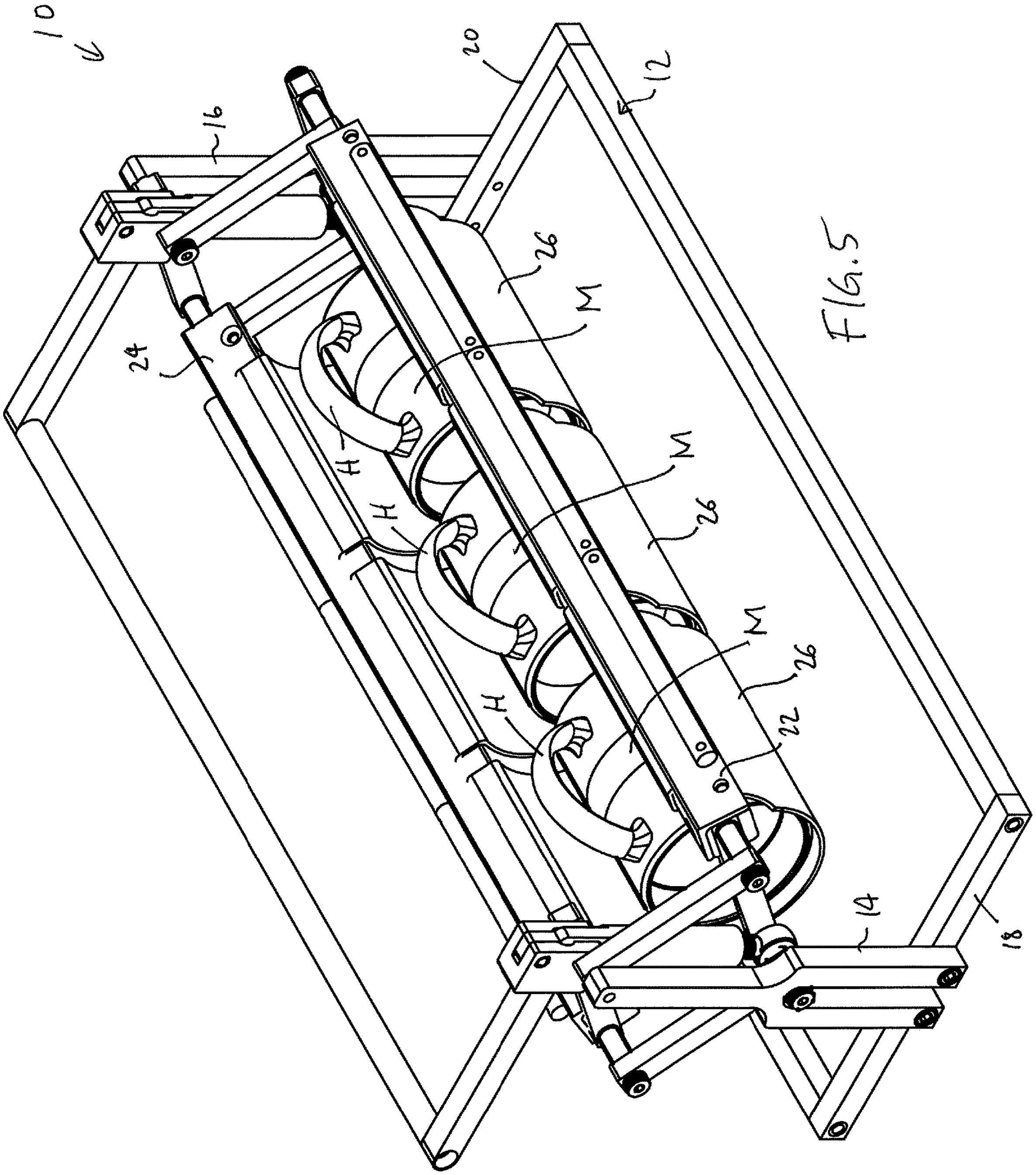
FIG. 5 is a perspective view of the sling of FIG. 1, in the open state and accommodating mugs resting on the silicone wraps, in accordance with the subject invention.
Figure 6:
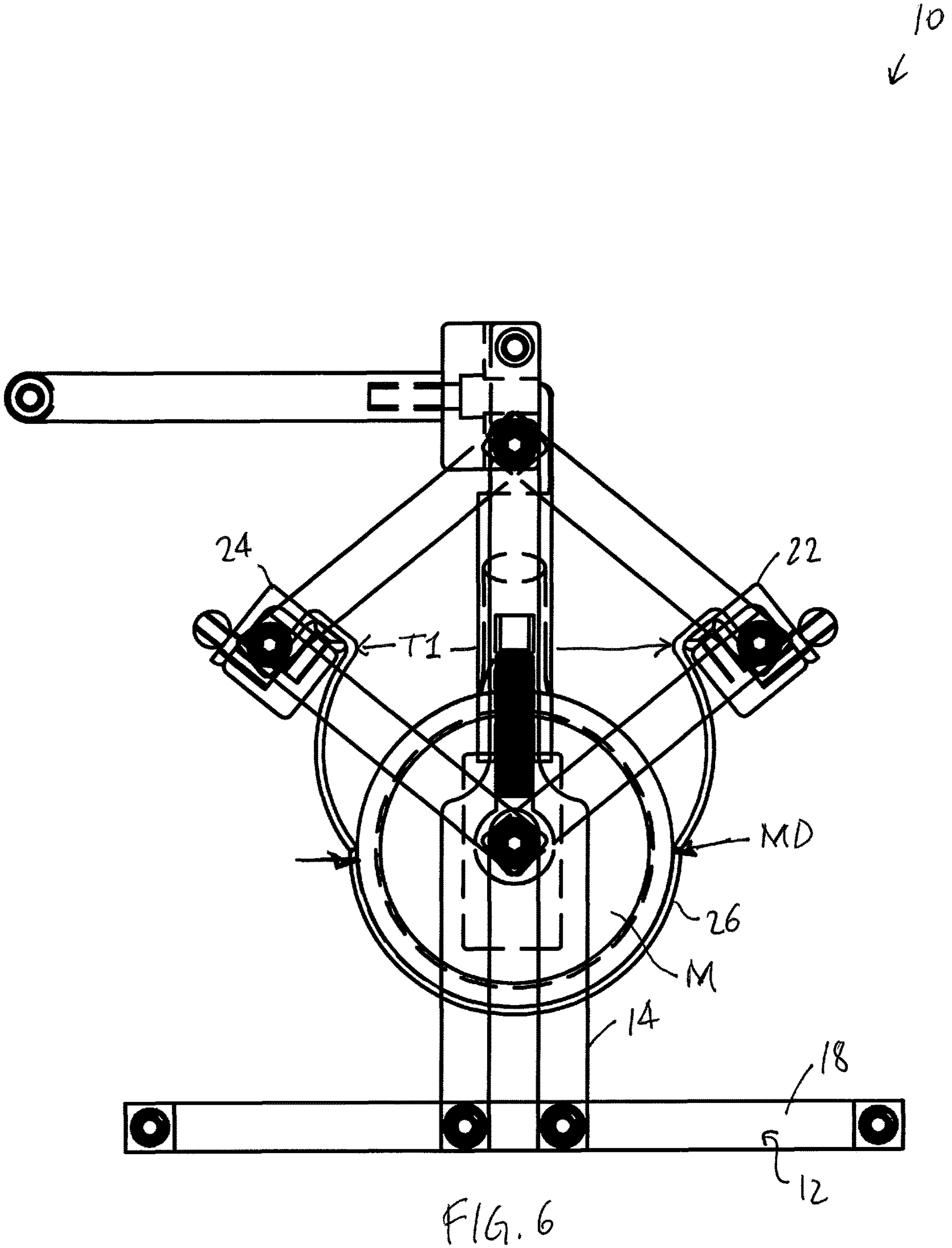
FIG. 6 is an end elevational view of the sling of FIG. 5.
Figure 7:
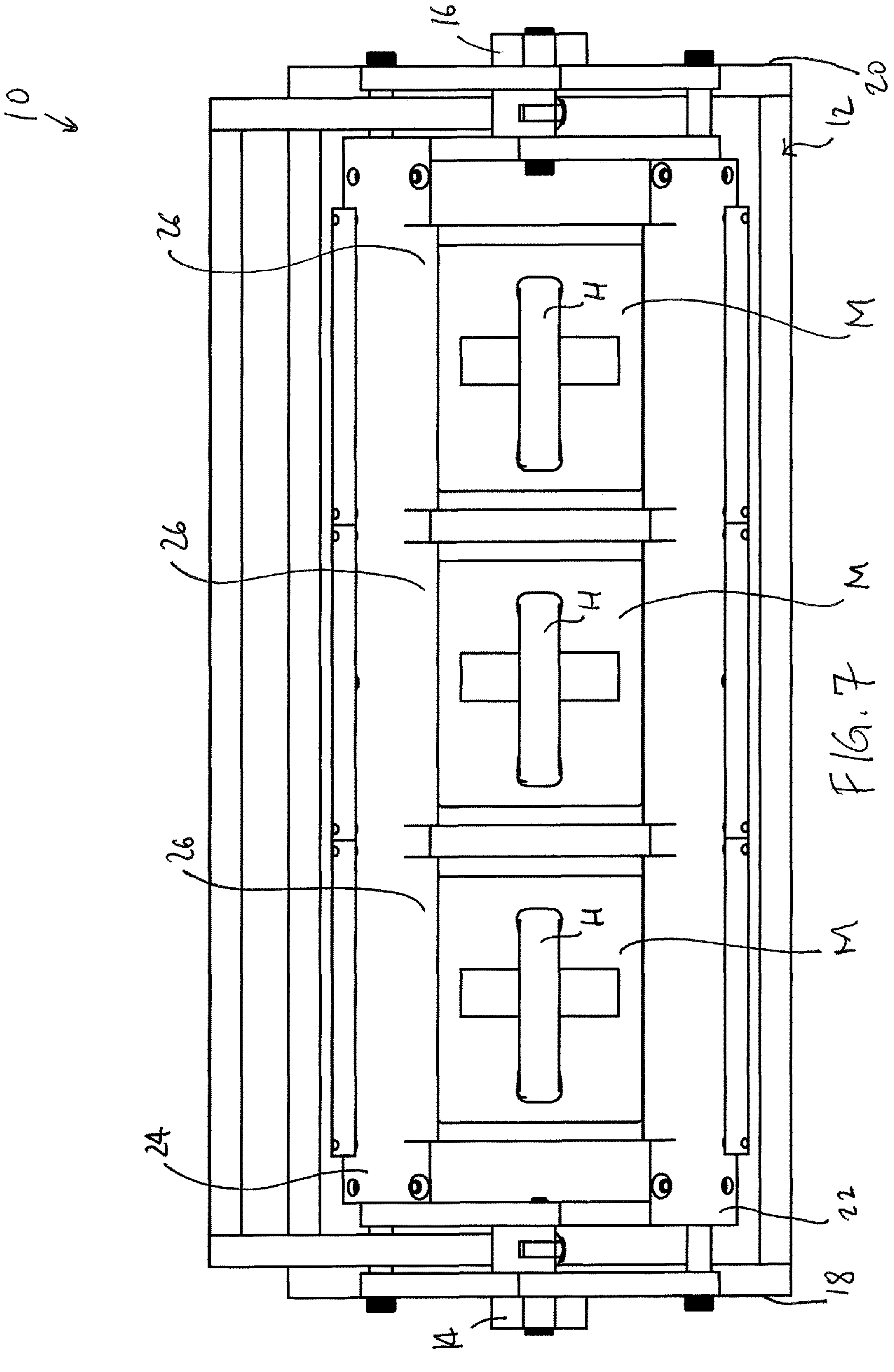
FIG. 7 is a top plan view of the sling of FIG. 5.
Figure 8:
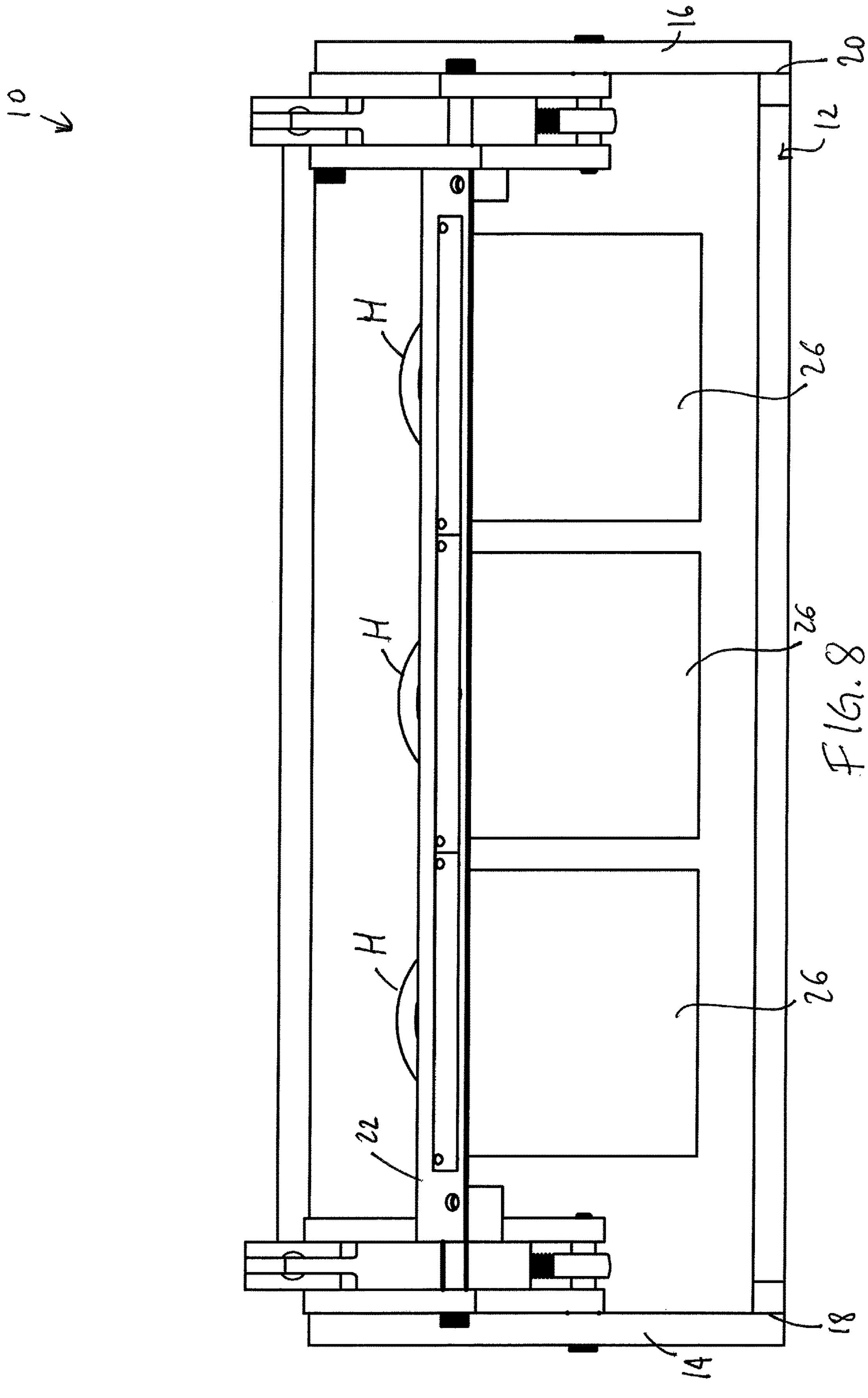
FIG. 8 is a side elevational view of the sling of FIG. 5.
Figure 9:
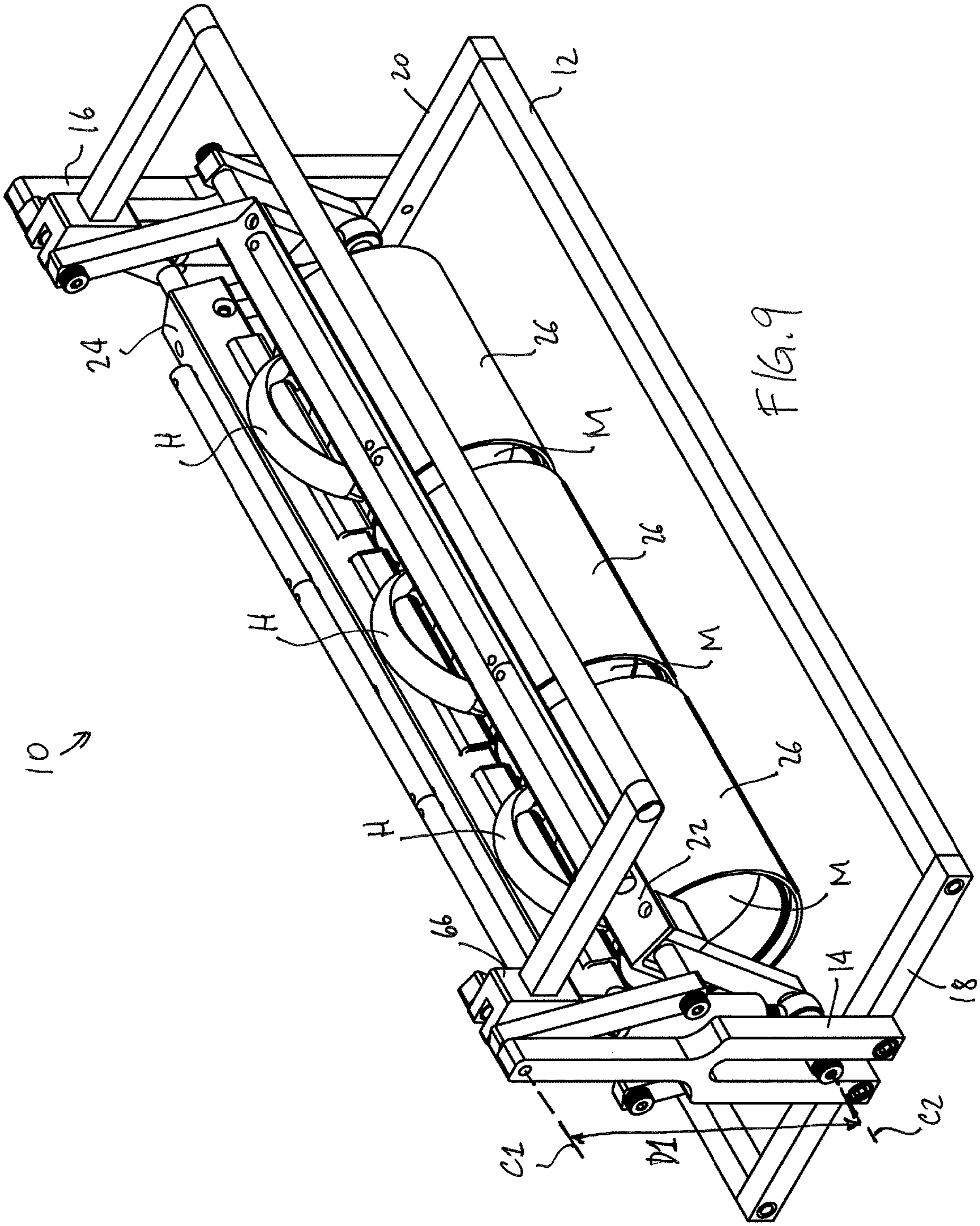
FIG. 9 is a perspective view of the sling of FIG. 1, in a closed state with mugs wrapped by the silicone wraps, in accordance with the subject invention.
Figure 10:
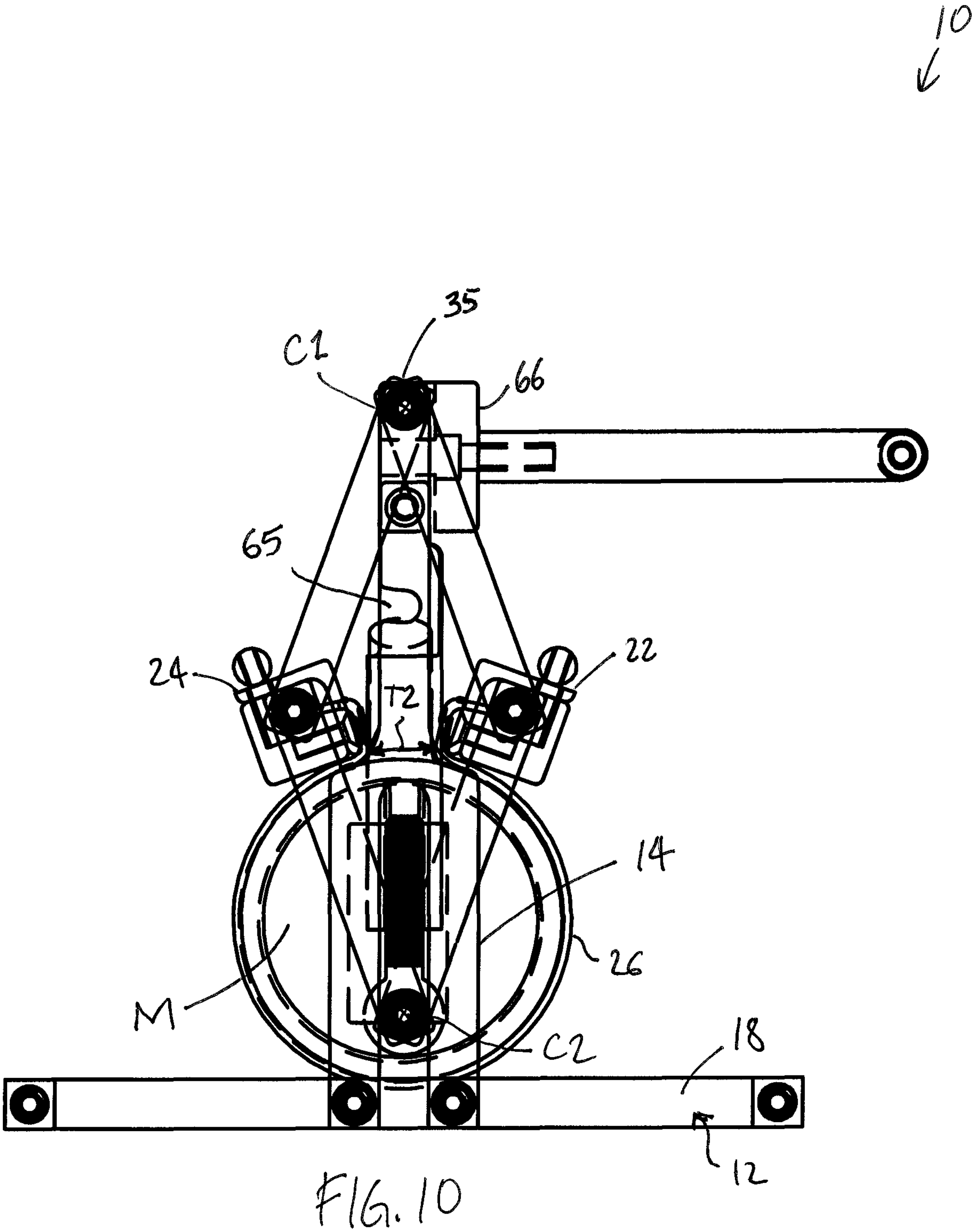
FIG. 10 is an end elevational view of the sling of FIG. 9.
Figure 11:
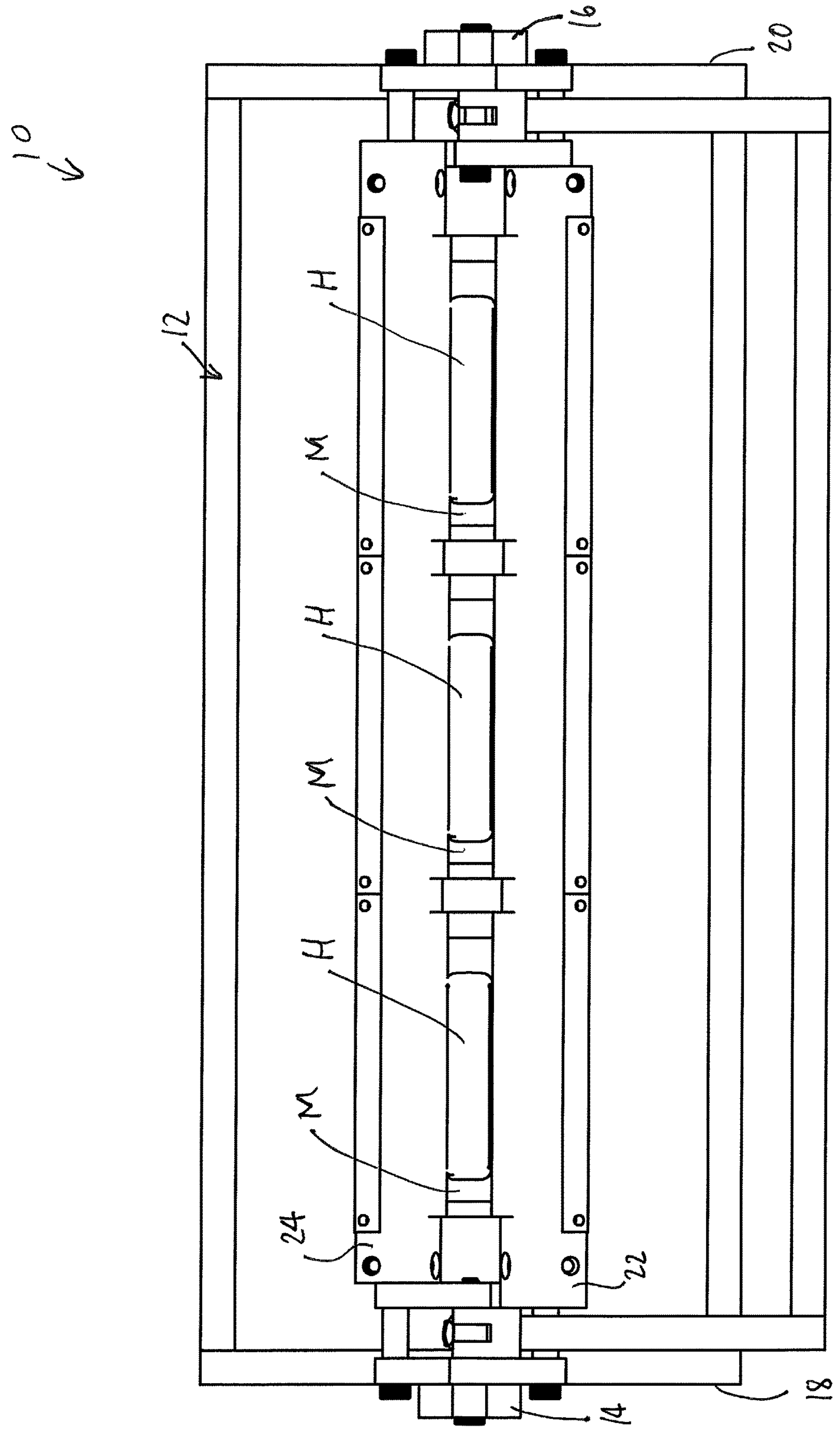
FIG. 11 is a top plan view of the sling of FIG. 9.
Figure 12:
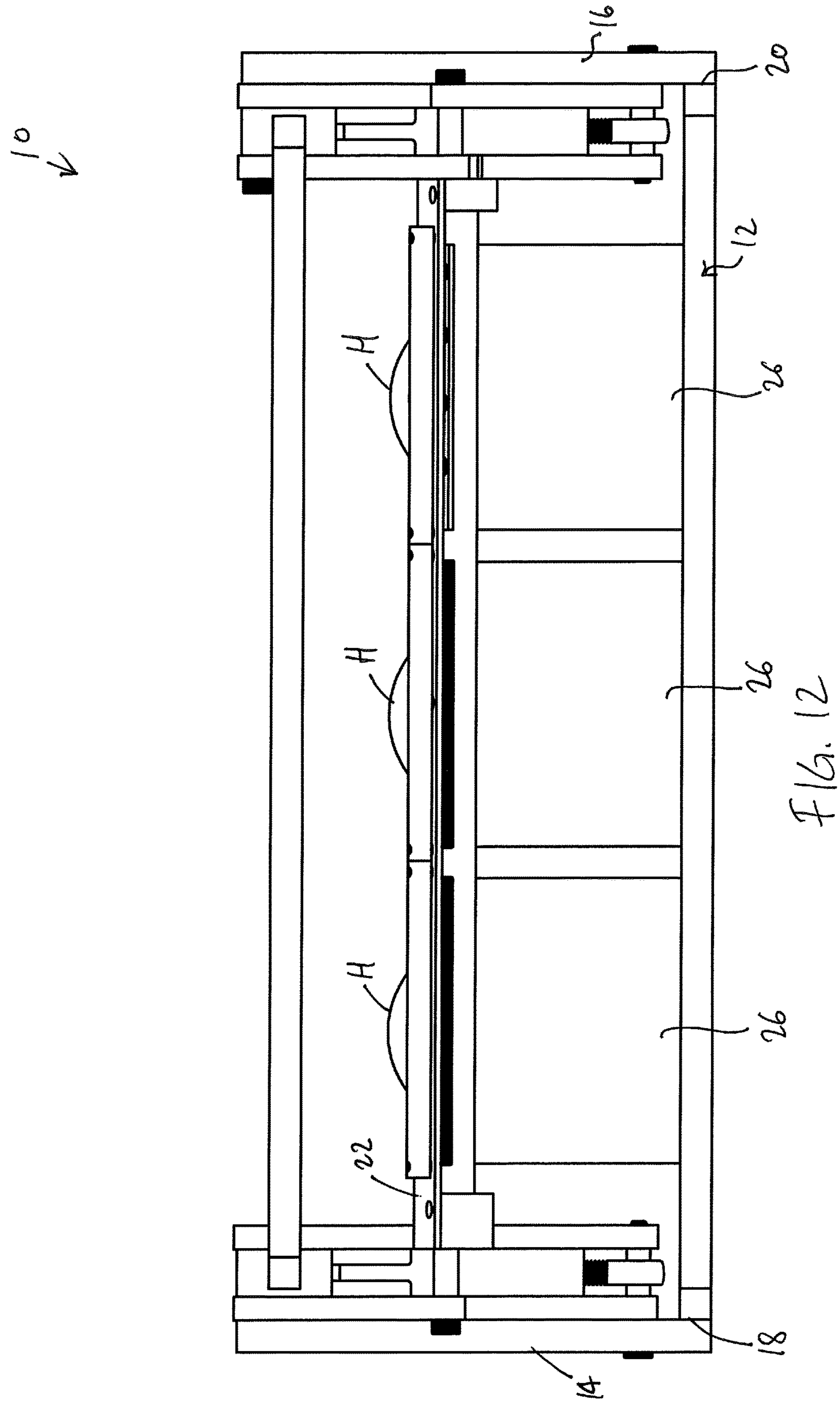
FIG. 12 is a side elevational view of the sling of FIG. 9.

The first and second arms 22, 24 are movable between an open state (FIGS. 1 and 5) and a closed state (FIG. 9). In the open state, as shown in FIG. 6, the first and second arms 22, 24 are spaced a first distance T1 to allow a diameter MD of the mug M to pass therebetween into resting engagement with the silicone wrap 26. In the closed state, the first and second arms 22, 24 are spaced a second distance T2 (FIG. 10) which is less than the distance T1. The sling 10, in the closed state with at least one mug M secured therein, may be placed in an oven for sublimation printing.

The silicone wrap 26 may be of any type known in the art used for wrapping sublimation transfers about mugs. The silicone wrap 26 must have sufficient length to pressingly engage the majority of circumference of the mug M with the first and second arms 22, 24 being in the closed state. As shown in FIGS. 5-12, in being loaded into the sling 10, handle H of the mug M should be oriented upwardly. With the sling 10 in the closed state, the first and second arms 22, 24 are configured to come into proximity with the handle H. This allows for maximum application of the silicone wrap 26 about the circumference of the mug M. Preferably, the silicone wrap 26 wraps at least 90% of the circumference of the mug M.

Figure 2:
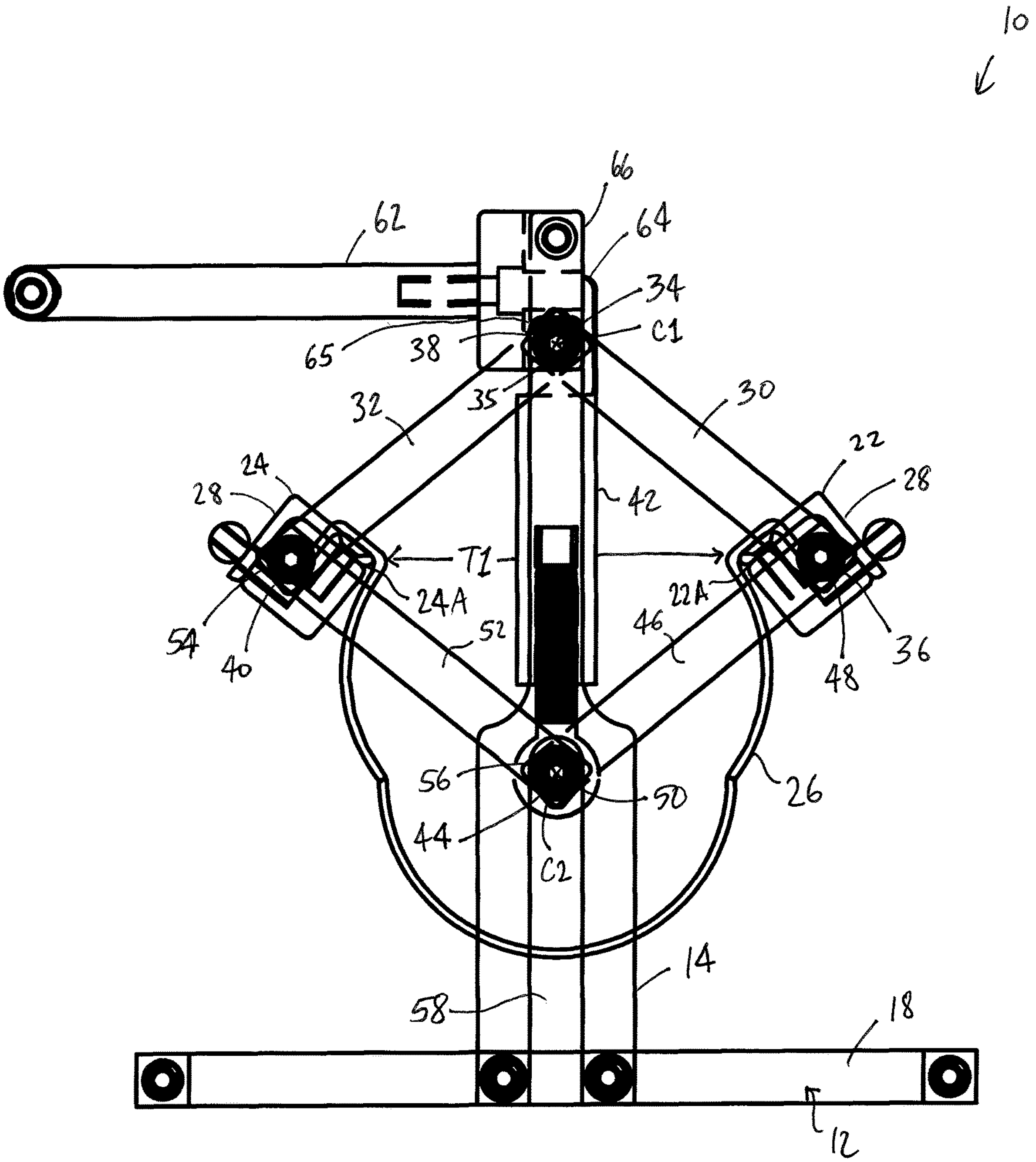
FIG. 2 is an end elevational view of the sling of FIG. 1.
Figure 3:
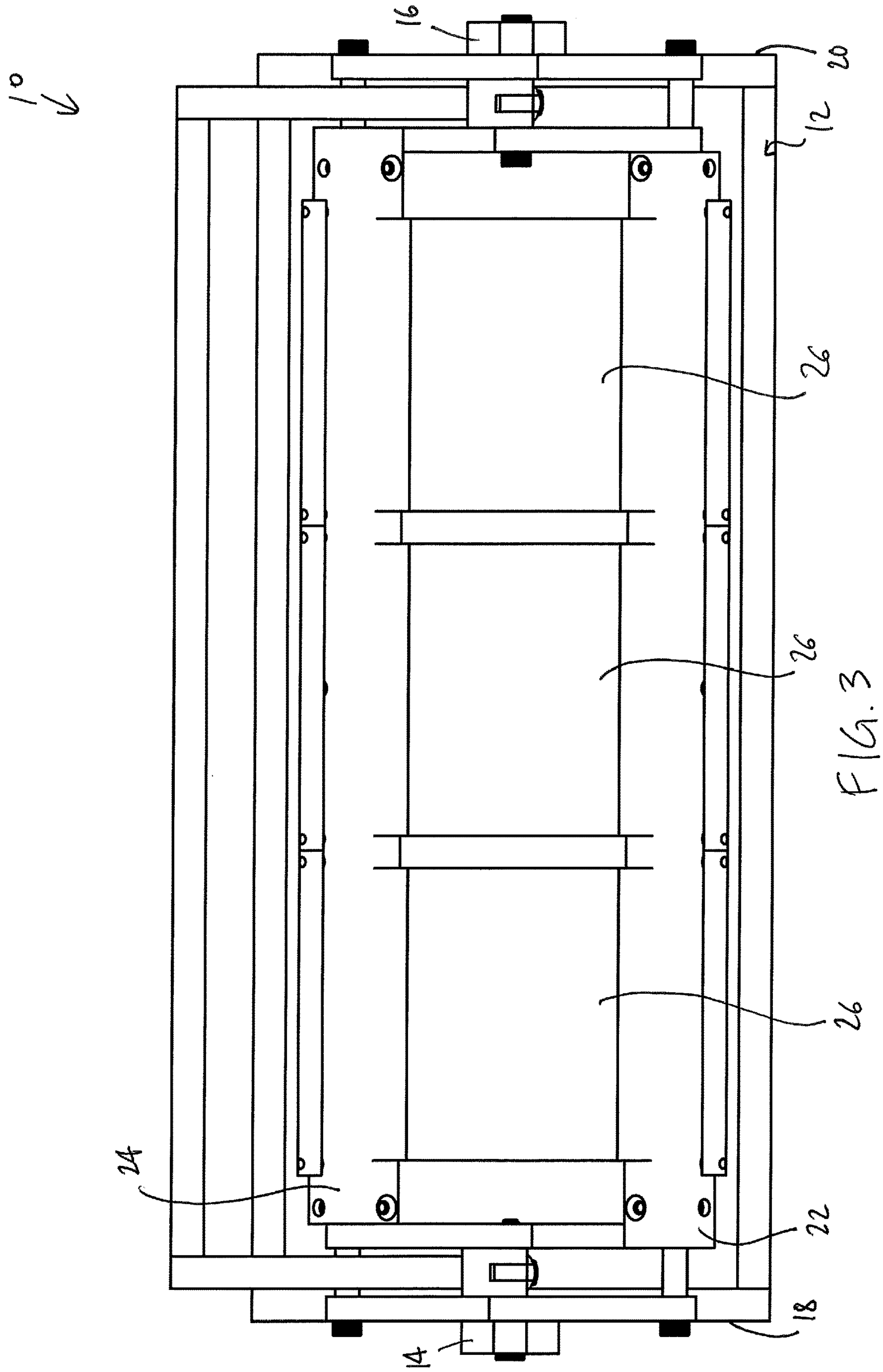
FIG. 3 is a top plan view of the sling of FIG. 1.
Figure 4:
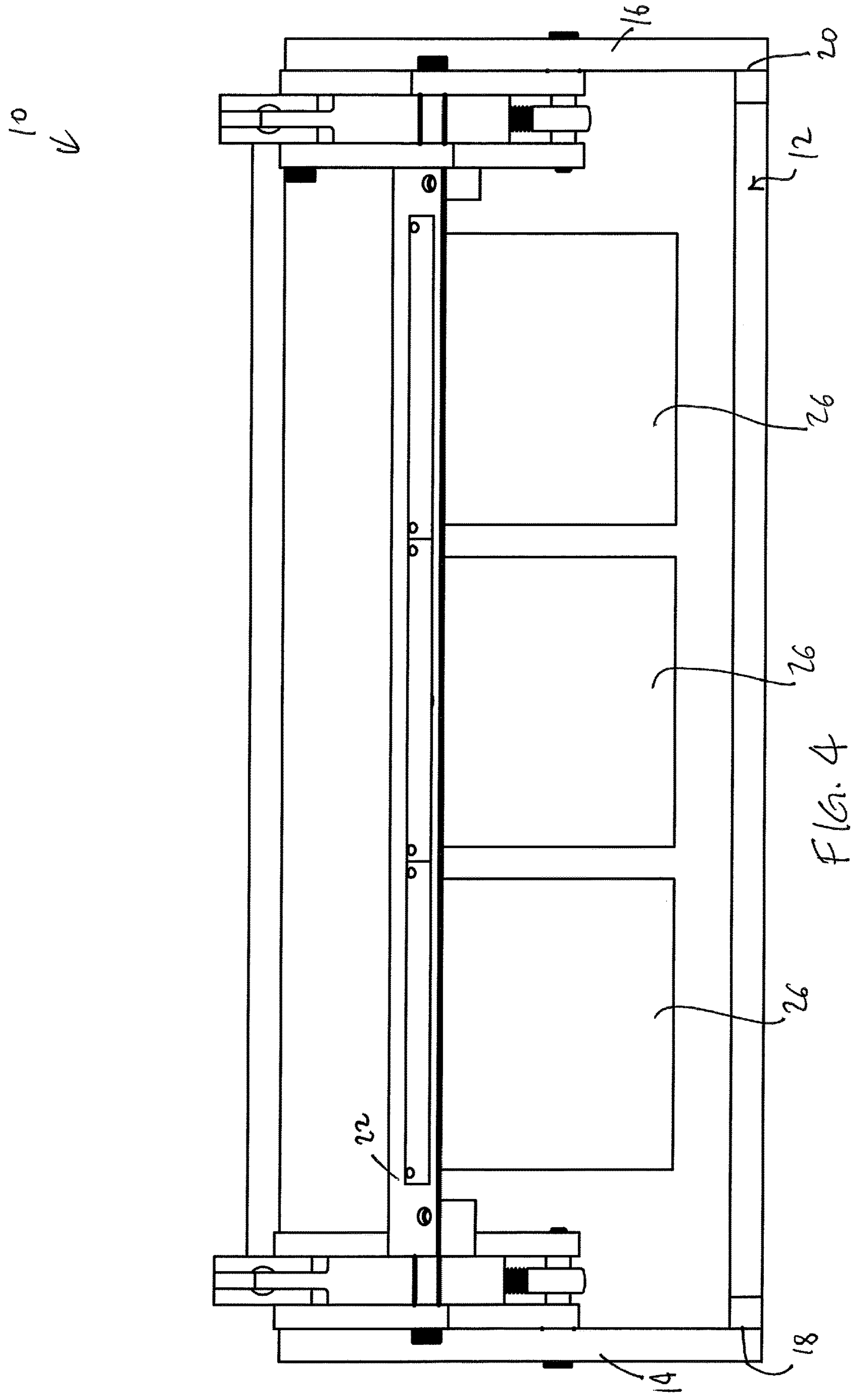
FIG. 4 is a side elevational view of the sling of FIG. 1.

As shown in FIG. 2, the silicone wrap 26 may be mounted to the first and second arms 22, 24 so as to cover internal portions 22A, 24A thereof. In this manner, the silicone wrap 26 contacts the mug M with no portion of the first and second arms 22, 24 coming into contact with the mug M. This allows for tension to be generated through the full length of the silicone wrap 26 between the first and second arms 22, 24 about the mug M.

It is noted that the mug M, when used with the sling 10, will have been prepared for sublimation printing by having a sublimation transfer wrapped thereabout held by heat resistant tape. In addition, a portion of the sublimation transfer may axially extend beyond the mug M to have an exposed surface on which may be printed identifying indicia, including indicia encoded in machine readable code, such as a bar code or QR code. The indicia may be used to generate a label for application to the bottom of the mug M to provide indicia corresponding to the image to be printed, useable to track the mug M. References herein to contact between the silicone wrap 26 and the mug M will include contact with the sublimation transfer wrapped about the mug M. As used herein, contact or engagement between the silicone wrap 26 and the mug M is taken to cover direct contact or engagement with the mug M and indirect contact or engagement with the mug M through a sublimation transfer or heat resistant tape wrapped about the mug M.

The silicone wrap 26 may be removably mounted to the first and second arms 22, 24 to allow for replacement thereof. A removable mounting flange 28 may be provided on each of the first and second arms 22, 24 to clamp down, or otherwise hold, ends of the silicone wrap 26. The mounting flange 28 may be mounted by screws, or other fasteners, to allow for removal thereof in replacing the silicone wraps 26. Moreover, a plurality of the silicone wraps 26 may be provided spaced apart along the first and second arms 22, 24, as shown in FIG. 1, with the mounting flanges 28 each extending across all of the silicone wraps 26 in allowing for group mounting and removal. If a plurality of the silicone wraps 26 is utilized, it is preferred that the silicone wraps 26 be spaced apart along the first and second arms 22, 24 to allow for heating about each of the mugs M to be accommodated. Alternatively, the silicone wraps 26 can be lengthened to accommodate more than one mug M. As will be appreciated by those skilled in the art, the sling 10 may be made to various lengths with various quantities of the silicone wraps 26, with the same or varying lengths, to accommodate different quantities of the mugs M.

The first and second arms 22, 24 may be pivotally mounted to the first and second stanchions 14, 16 in any known manner. By way of non-limiting example, the pivotal mounting may be provided by elongated first and second linkages 30, 32 pivotally mounted to the first stanchion 14. In particular, a first linkage end 34 of the first linkage 30 may be pivotally mounted to the first stanchion 14, with a second linkage end 36 of the first linkage 30 being mounted to the first arm 22. In addition, a third linkage end 38 of the second linkage 32 may be pivotally mounted to the first stanchion 14, with a fourth linkage end 40 of the second linkage 32 being mounted to the second arm 24. With this arrangement, rotation of the first linkage 30 about the first linkage end 34 and the second linkage 32 about the third linkage end 38 causes the first and second arms 22, 24 to move between the open and closed states.

The pivotal mounting may further include a first slider 42 having a first slider end 44 constrained to move axially along the first stanchion 14. An elongated third linkage 46 may be provided having a fifth linkage end 48 pivotally mounted to the second linkage end 36 of the first linkage 30, and a sixth linkage end 50 pivotally mounted to the first slider 42. Further, an elongated fourth linkage 52 may be provided having a seventh linkage end 54 pivotally mounted to the fourth linkage end 40 of the second linkage 32, and an eighth linkage end 56 pivotally mounted to the first slider 42. With this arrangement, axial movement of the first slider 42 is translated into the rotation of the first linkage 30 about the first linkage end 34 and the second linkage 32 about the third linkage end 38 in causing the first and second arms 22, 24 to move between the open and closed states.

Preferably, the first linkage end 34, of the first linkage 30, and the third linkage end 38, of the second linkage 32, are pivotally mounted to the first stanchion 14 to rotate about a first common axis C1. A cylindrical member 35, such as a bushing, bolt, or the like, may be provided to coincide with the first common axis C1 and about which elements may rotate. In addition, preferably, the sixth linkage end 50, of the third linkage 46, and the eighth linkage end 56, of the fourth linkage 52, are pivotally mounted to the first slider 42 to rotate about a second common axis C2. The second common axis C2 may be located to coincide with the first slider end 44. As shown in comparing FIGS. 1 and 9, the distance D1 between the common axis C1 and the common axis C2 is greater in the closed state. The first common axis C1 may be stationary allowing for one rotational degree of freedom, whereas, the second common axis C2 may be axially movable thereby allowing for two degrees of freedom (one rotational, one linear).

The first slider end 44 may be constrained to axial movement along the first stanchion 14 using any known technique. By way of non-limiting example, the first stanchion 14 may include a first channel 58 extending along a length thereof. The first slider end 44 includes a first sleeve 60 seated in the first channel 58 configured to coact with the first channel 58 to constrain the first slider end 44 to axial movement. The first sleeve 60 may include a friction-reducing element for engagement with the first stanchion 14 along the first channel 58, such as a ball bearing, bushing, lubricious outer surface, and so forth.

To facilitate opening and closing of the sling 10, a handle 62 may be provided which is pivotally mounted to the first and second stanchions 14, 16. In addition, the handle 62 may be coupled to the first slider 42 to cause axial movement thereof. In this manner, with the handle 62 controlling axial movement of the first slider 42, the handle 62 is useable to adjust the sling 10 between open and closed states.

The handle 62 may be coupled to the first slider 42 in any known manner to cause axial movement thereof. By way of non-limiting example, a second slider end 64 of the first slider 42 may be pivotally mounted to the handle 62. In addition, the first slider end 44 may be pivotable about the first sleeve 60, so as to be rotatable about the second common axis C2. In this manner, the first slider 42 is rotatable about the second common axis C2. The handle 62 may be pivotally mounted to the first stanchion 14 so as to be rotatable about the first common axis C1. As shown in FIG. 2, in the open state of the sling 10, the handle 62 is located to be located above the first common axis C1. In this state, the first slider end 44 is located in an up position in the first channel 58. To close the sling 10, the handle 62 is caused to rotate about the first common axis C1, about the first stanchion 14, to the state shown in FIG. 10. As shown, the handle 62 is located below the first common axis C1 with the first slider end 44 having been displaced to a down position in the first channel 58. The downward displacement of the first slider end 44 causes the first and second arms 22, 24 to be drawn inwardly to the closed state. Reverse rotation of the handle 62 back to the state shown in FIG. 2 returns the first slider end 44 to the up position, with the first and second arms 22, 24, returning to the open state. A relief 65 may be provided on the first slider 42 formed to receive the cylindrical member 35 with the first slider 42 being in the up position.

A first pivot block 66 may be provided on the handle 62 with the first pivot block 66 being pivotally mounted to the first stanchion 14 about the first common axis C1. In addition, the second slider end 64 may be pivotally mounted to the first pivot block 66. With rotation of the handle 62, the first pivot block 66 is shifted between the up position shown in FIG. 2 (with the sling 10 being open) and the down position shown in FIG. 10 (with the sling 10 being closed).

As will be understood by those skilled in the art, an automated mechanism may be provided to rotate the handle 62 between open and closed states. A roller, grip, or other cooperating element may be provided on the handle 62 for engagement by the automated mechanism.

The arrangements discussed above with respect to the first stanchion 14 for pivotal movement of the first and second arms 22, 24 may be provided on the second stanchion 16 in similar form.

It is preferred that the first and second arms 22, 24 move away from each other and away from the base 12 in moving from the closed state to the open state. Post-printing requires release of the sling 10 and removal of the mugs 10. The sublimated dyes may not be fully set and minimal contact between the silicone wraps 26 and the mugs M is desired. In addition, as shown in FIG. 2, it is preferred that the silicone wrap 26 have two differently dimensioned portions, with a lower cradle portion 26A, having a diameter slightly greater than the diameter MD of the mug M (>MD), and an upper, wider mouth portion 26B, defining an opening much wider than the diameter MD of the mug M (>>MD).

It is also noted that the first and second arms 22, 24 may be fixed in the open state and the closed state due to an inherent locking effect provided by the first linkage 30, the second linkage 32, the third linkage 46, and the fourth linkage 52. In particular, with reference to FIG. 2, the sling 10 is shown in an open position. The first linkage 30 and the third linkage 46 are arranged relative to each other to counteract an inward force applied to the first arm 22, thus maintaining the sling 10 in the open position. The first linkage 30 and the third linkage 46 may be symmetrically arranged at the same angle to the first stanchion 14 about the first arm 22. In this arrangement, any applied normal force is equally resolved along the first linkage 30 and the third linkage 46 thereby providing an equalizing counterforce to the normal force. The same applies to the closed state of the sling 10 shown in FIG. 10. The second linkage 32 and the fourth linkage 52 may be similarly symmetrically arranged at the same angle (relative to the first stanchion 14) about the second arm 24.

The sling 10 will be utilized in high temperatures for sublimation printing. The materials used to form the sling 10 must be resistant to repeated exposure of temperatures up to 400° F. The sling 10 should be formed of metallic materials, particularly those useable in repeated exposure to elevated temperatures, such as steel (stainless steel). Metallic tubing may be used in places to assist in heat dissipation.

What is claimed is:

1. A sling for supporting mugs during sublimation printing, the sling comprising:

an elongated base having a first end and a second end, the first end being spaced from the second end;

a first stanchion mounted to the first end of the base;

a second stanchion mounted to the second end of the base;

a first arm extending between, and pivotally mounted to, the first and second stanchions;

a second arm extending between, and pivotally mounted to, the first and second stanchions;

an elongated first linkage having a first linkage end and a second linkage end, the second linkage end being spaced from the first linkage end, the first linkage end being pivotally mounted to the first stanchion, the second linkage end being mounted to the first arm;

an elongated second linkage having a third linkage end and a fourth linkage end, the fourth linkage end being spaced from the third linkage end, the third linkage end being pivotally mounted to the first stanchion, the fourth linkage end being mounted to the second arm;

a first slider having a first slider end constrained to axial movement along the first stanchion, wherein the first stanchion includes a first channel, and wherein the first slider end includes a first sleeve seated in the first channel to constrain the first slider end to the axial movement along the first stanchion;

an elongated third linkage having a fifth linkage end and a sixth linkage end, the sixth linkage end being spaced from the fifth linkage end, the fifth linkage end being pivotally mounted to the second linkage end, the sixth linkage end being pivotally mounted to the first slider;

an elongated fourth linkage having a seventh linkage end and an eighth linkage end, the eighth linkage end being spaced from the seventh linkage end, the seventh linkage end being pivotally mounted to the fourth linkage end, the eighth linkage end being pivotally mounted to the first slider; and, at least one silicone wrap secured to the first and second arms so as to be suspended therebetween, wherein, the first and second arms are movable between an open state, where the first and second arms are spaced a first distance to allow a mug to pass therebetween into a resting engagement with the at least one silicone wrap, and a closed state, where the first and second arms are spaced a second distance less than the first distance, and, wherein the axial movement of the first slider is translated into rotation of the first linkage about the first linkage end and rotation of the second linkage about the third linkage end in causing the first and second arms to move between the open and closed states.

2. The sling of claim 1, wherein the at least one silicone wrap includes a plurality of silicone wraps are secured to the first and second arms so as to be suspended therebetween.

3. The sling of claim 1, further comprising:

a handle pivotally mounted to the first and second stanchions, the handle being coupled to the first slider such that pivotal movement of the handle causes the axial movement of the first slider end.

4. The sling of claim 3, wherein the first slider includes a second slider end pivotally mounted to the handle.

5. The sling of claim 1, wherein the first and second arms move away from each other and away from the base in moving from the closed state to the open state.

* * * * *